United States Patent
Stein et al.

(10) Patent No.: US 7,381,924 B2
(45) Date of Patent: Jun. 3, 2008

(54) METHOD AND APPARATUS TO ADAPTIVELY COOL A WELDING-TYPE SYSTEM

(75) Inventors: Alan E. Stein, Little Chute, WI (US); David A. Werba, Oshkosh, WI (US); Jeffery J. Gadamus, Hortonville, WI (US); LeRoy H. Lauer, Jr., Hortonville, WI (US); Justin L. Paquette, Manton, WI (US); Michael Sammons, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 478 days.

(21) Appl. No.: 10/605,546

(22) Filed: Oct. 7, 2003

(65) Prior Publication Data

US 2005/0016979 A1   Jan. 27, 2005

Related U.S. Application Data

(63) Continuation-in-part of application No. 10/604,459, filed on Jul. 23, 2003.

(51) Int. Cl.
*B23K 9/10* (2006.01)

(52) U.S. Cl. .................................. 219/137.62

(58) Field of Classification Search ........... 219/137.62, 219/136, 120, 121.49
See application file for complete search history.

(56) References Cited

U.S. PATENT DOCUMENTS

| | | | | |
|---|---|---|---|---|
| 2,510,207 A | * | 6/1950 | Behnke et al. | ......... 219/137.42 |
| 2,949,528 A | | 8/1960 | Bernard et al. | |
| 2,995,647 A | * | 8/1961 | Bernard | ................... 219/137.9 |
| 3,019,329 A | | 1/1962 | Zeller | |
| 3,210,515 A | | 10/1965 | White | |
| 3,521,023 A | * | 7/1970 | Dahlman et al. | ............. 219/75 |
| 4,942,281 A | * | 7/1990 | Srba | ............................ 219/75 |
| 5,121,788 A | * | 6/1992 | Carollo | ........................ 165/47 |
| 5,266,778 A | * | 11/1993 | Bailey | ........................ 219/497 |
| 5,378,868 A | * | 1/1995 | Burkhardt et al. | ........... 219/89 |

(Continued)

FOREIGN PATENT DOCUMENTS

FR          2 536 320         *    5/1984

(Continued)

OTHER PUBLICATIONS

Diamondack Series GTAW Torches Owner's Manual, Miller Electric Mfg. Co., Sep. 2000.

(Continued)

*Primary Examiner*—Kevin P Kerns
(74) *Attorney, Agent, or Firm*—Ziolkowski Patent Solutions Group, SC

(57) ABSTRACT

A cooling system connected to provide coolant to a welding-type component automatically circulates coolant through the welding component upon activation of the welding component. A controller is configured to regulate the cooling system such that upon activation of the welding-type component coolant is caused to at least flow through the welding-type component, and circulate after deactivation of the welding torch until a temperature of the coolant falls below a certain value or a specified time period has expired. The cooling system is constructed to be integrally disposed within a power source housing.

24 Claims, 5 Drawing Sheets

U.S. PATENT DOCUMENTS

| | | | |
|---|---|---|---|
| 5,719,367 A * | 2/1998 | Young | 219/86.31 |
| 6,026,682 A * | 2/2000 | McCormick | 73/196 |
| 6,399,913 B1 | 6/2002 | Sammons et al. | |
| 2005/0205542 A1 * | 9/2005 | DeCoster et al. | 219/137.62 |

FOREIGN PATENT DOCUMENTS

| | | |
|---|---|---|
| FR | 2 723 330 | 2/1996 |
| GB | 827314 | 2/1960 |
| GB | 1 225 907 | 3/1971 |
| GB | 1 243 596 | 8/1971 |
| WO | WO-2004/028738 A2 | 4/2004 |

OTHER PUBLICATIONS

Syncrowave 250 DX Owner's Manual, Miller Electric Mfg. Co., Mar. 2003.

* cited by examiner

METHOD AND APPARATUS TO ADAPTIVELY COOL A WELDING-TYPE SYSTEM

CROSS REFERENCE TO RELATED APPLICATIONS

The present invention is a continuation-in-part and claims priority of U.S. Ser. No. 10/604,459 filed Jul. 23, 2003, which is incorporated herein by reference.

BACKGROUND OF INVENTION

The present invention relates generally to welding-type systems and, more particularly, to a method and apparatus of an automatically and conditionally cooling a welding-type system upon activation of the welding-type system. More particularly, the invention relates to circulating coolant automatically through a power source and a welding-type torch upon initiation of a welding-type process.

It is well known that certain welding processes such as heavy-duty TIG (tungsten inert gas) welding generate a considerable amount of heat during the welding process. A welding component or welding torch is commonly used to hold a tungsten electrode that is heated to join metals through heat transfer. Because tungsten is a rare metallic element with an extremely high melting point (approximately 3410° C.), the electrode can withstand a tremendous heat load and use the heat to join metals with or without filler material. The heat generated, however, can cause the welding torch to become increasingly heated. A cooling system is typically required to prevent overheating of the torch. Generally, the welding torch is liquid-cooled with coolant, such as water, which is supplied from a coolant source remote from the power source. The welding torch may also be air cooled.

One of the drawbacks with these standard cooling systems is that the cooling system is manually operable. That is, a typical cooling system is equipped with an ON/OFF switch that requires an operator to manually turn on the cooling system at the commencement of the welding process. When the cooling system is activated, coolant is caused to circulate through the power source and the welding torch. It can therefore be problematic if the operator forgets to turn the cooling system on before commencing welding. As a result, the temperature of the torch quickly rises to maximum acceptable limits and if not immediately cooled, can cause the torch to break down and malfunction. It is also costly to interrupt the welding process and allow the torch to cool. Moreover, the operator may forget to turn off the cooling system during extended periods of downtime. As such, the cooling system continues to circulate coolant to the welding torch even when cooling is not needed which increases energy consumption and causes premature wear out of components.

Another disadvantage of manually actuated cooling system rests in that the operator may turn off the cooling system prematurely following completion of a welding session. It may take several minutes following welding termination for the temperature of the torch to drop below an acceptable set point. However, if the operator prematurely shuts down the cooling system, the temperature of the torch may actually increase for a short and potentially damaging period. These drawbacks can significantly reduce the life expectancy of the cooling system and/or torch and increase the overall energy consumption of the system. All of which increases the costs of the welding system.

Therefore, it would be desirable to design a cooling system that automatically circulates coolant through at least the welding torch upon activation of the torch or commencement of the welding process and maintains coolant flow until the temperature of the torch falls below a specified set point or expiration of a prescribed time period that is of sufficient length to allow the torch to cool to below the specified set point.

BRIEF DESCRIPTION OF INVENTION

The present invention solves the aforementioned problems by providing a cooling system with associated circuitry and sensory devices that causes coolant to flow in a torch of a welding system automatically upon activation of the torch or commencement of welding at a weld. Commencement of the welding process occurs when a welding arc is struck between an electrode and a workpiece. The cooling system is configured to circulate the coolant through the torch for a set period of time after deactivation of the torch or until temperature of the torch falls below a temperature set point.

There are a large number of welding processes available for use in industry. These welding processes include gas tungsten arc, oxygen gas welding, and shielded metal arc welding. The gas tungsten arc welding process is generally referred to as TIG (tungsten inert gas) welding. A typical TIG welding apparatus includes a welding component which is commonly referred to as welding torch and is designed to introduce a tungsten electrode to a weld. The welding torch holds the electrode which is heated to extremely high temperatures by electrical power received from the power source. The welding torch is designed to introduce the electrode to a weld such that the electrode "scratches" the workpiece and is removed therefrom. At appropriate voltage and current, a welding arc is created between the electrode and the workpiece. The torch typically includes a trigger mechanism for initiating the welding process, i.e., closing the circuit between the workpiece and the power source.

Accordingly, one aspect of the present invention includes a welding-type component configured to present an electrode to a weld. A cooling system is configured to automatically circulate liquid coolant through at least the welding-type component upon activation of the welding-type component.

In accordance with another aspect of the invention, a welding apparatus includes a power source and a cooling system. A welding torch is connected to both the power source and the integrated cooling system. A controller is configured to regulate the integrated cooling system such that, upon activation of the welding torch, coolant is caused to at least flow through the welding torch and continue to circulate after deactivation of the welding torch until a temperature of the torch or coolant falls below a certain value.

In accordance with yet another aspect of the invention, a method for cooling a welding-type component includes the step of detecting activation of a welding-type component. The method further includes that the steps automatically circulating coolant through the welding-type component upon activation of the welding-type component and maintaining coolant circulation through the welding-type component for a limited period after the welding-type component is deactivated.

According to yet another aspect of the present invention, a welding-type apparatus includes means for providing welding-type power and means for outputting welding-type power to an output area. The apparatus further includes means for detecting activation of the means for the outputting welding-type power and means for automatically circulating coolant through at least the means for providing welding-type power upon activation of the means for outputting welding-type power and maintaining coolant circulation until coolant temperature falls below a certain set point.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
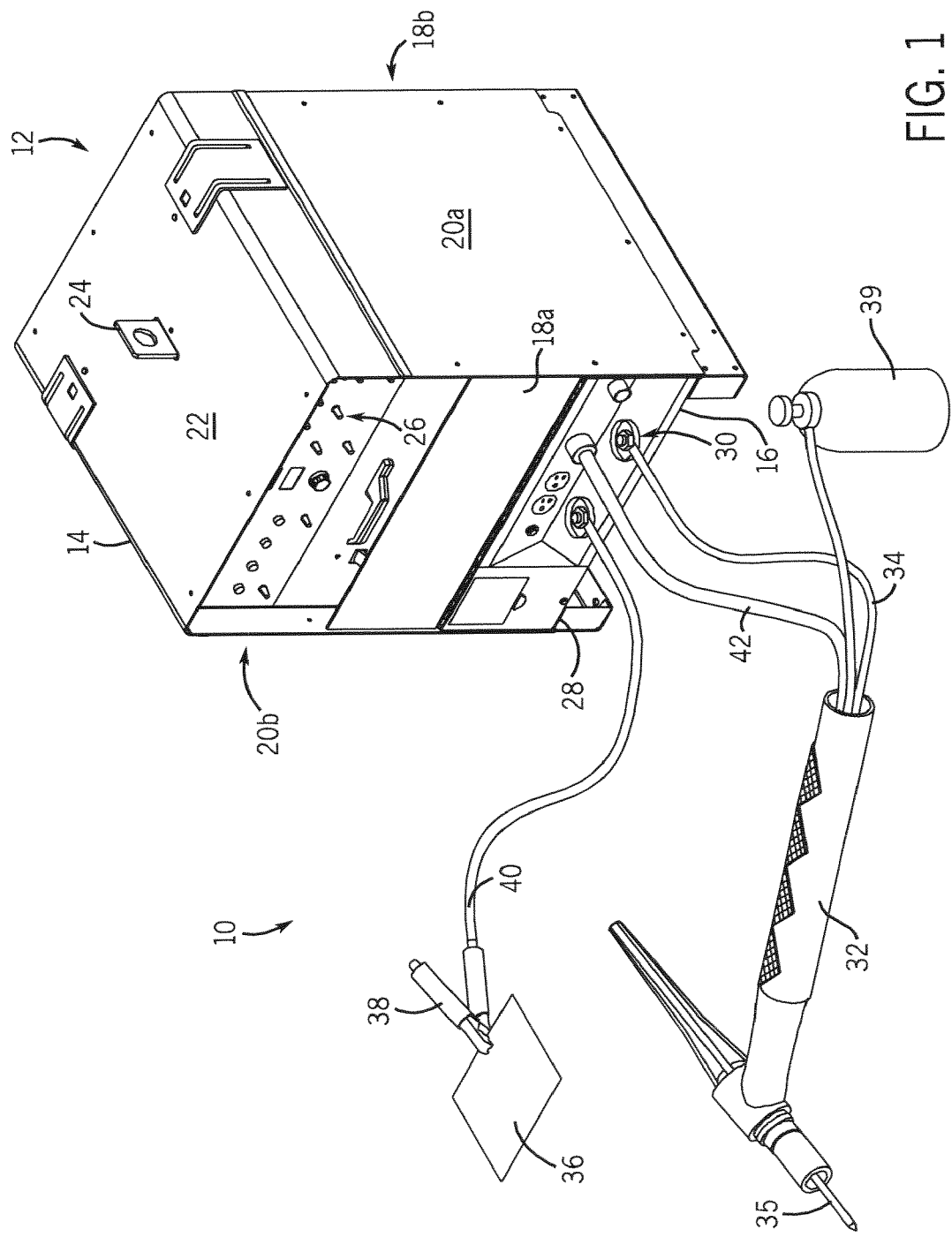
FIG. 1 is a perspective view of a welding-type system incorporating the present invention.

FIG. 1 is a perspective view of a welding-type system 10 suitable for a number of welding processes including tungsten inert gas (TIG) welding and stick welding. The welding-type system 10 includes a power source 12 disposed within an enclosure 14. Enclosure 14 is defined by a base 16, front and back panels 18a, 18b, and a pair of side panels 20a, 20b attached to the base 16. A top cover 22 having a lifting means 24 is secured to the pair of side panels 20a, 20b to form enclosure 14. The front panel includes control knobs 26 and outlets and receptacles 28 to facilitate connection of welding accessories to the enclosure. For example, an electrode weld output terminal 30 is used to connect a torch or other welding-type component 32 to the power source via cable 34. The torch is designed to hold a tungsten electrode 35. To complete a welding circuit, a workpiece 36 is introduced to a weld by a clamp 38 that is also connected to the power source by cable 40. A gas cylinder 39 is used to store shielding gas which is delivered to the torch during the welding process.

Enclosed in the enclosure 14 are the welding-type power source and a cooling system. The power source is constructed to condition raw power from a power supply into a power suitable for welding. In the preferred embodiment, the welding-type power supply and cooling system are disposed within the common enclosure 14. The cooling system is designed to circulate coolant through the torch 32 via coolant conduit 42. The coolant system is designed such that coolant automatically flows into the torch when the welding process begins, i.e., the torch is activated or an arc is struck. Alternately, the integrated cooling system may be remote from the power source.

Figure 2:
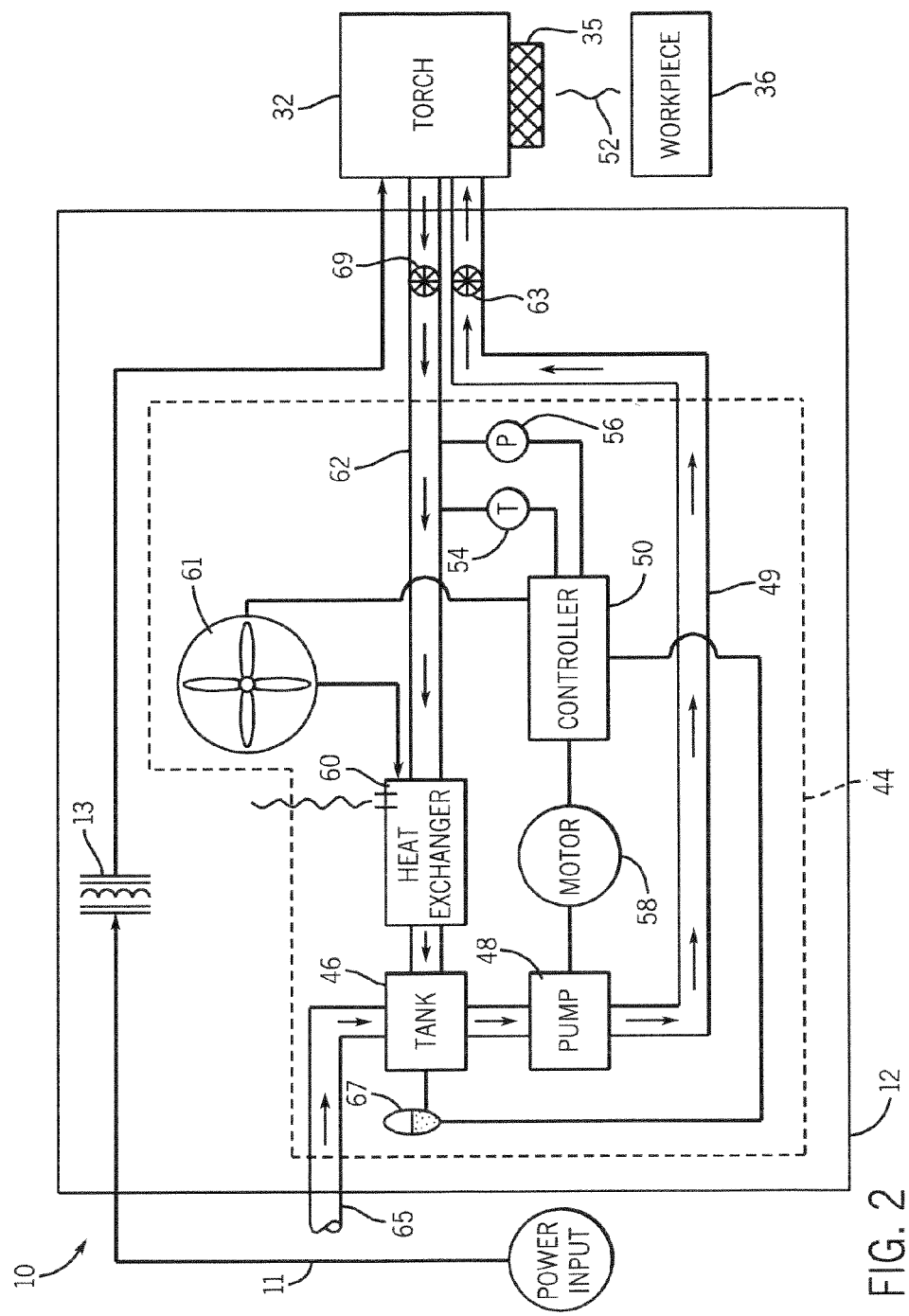
FIG. 2 is a block diagram of a welding system in accordance with one aspect of the present invention.

FIG. 2 is a block diagram of a welding system 10 designed to condition raw power from a raw power input 11 into a form usable in a welding-type process. The system includes a power source 12, a power conditioning or transformer assembly 13, a TIG torch 32, a work piece 36, and a cooling system 44. The cooling system 44 includes a coolant tank 46 and pump assembly 48 designed to pump fluid from the tank to heat zones in the welding system, such as the electrode holder or torch 32, in response to control signals from controller 50. Alternately, pump 48 or other circulation powering device may re-circulate fluid contained in fluid path 49 rather than pulling coolant from tank 46. The cooling system 44 is configured to adaptively circulate coolant to and from torch 32 upon activation. For example, coolant circulation automatically begins when a welding arc 52 is struck between the tungsten electrode 35 and the workpiece 36.

Controller 50 is adapted to electronically communicate with the cooling system to effectuate automatic commencement of coolant circulation to torch 32 when the welding process begins. The controller 50 is also connected to a temperature sensor 54 designed to provide feedback as to the temperature of the torch and/or the coolant within the torch as well as a pressure sensor or flow meter 56 to provide feedback regarding coolant pressure in the system. In this regard, controller 50 can turn on or off pump 48 to control the flow of coolant to and from the torch. The temperature sensor 54 provides temperature feedback to the controller such that circulation is maintained after a welding process is complete if the temperature exceeds a specified set point. Controller 50 may also include a timer that regulates or maintains coolant circulation for a specified period. The timer is designed to define a cool-down period of sufficient duration to allow the torch to cool.

Cooling system 44 also includes a motor assembly 58 to drive pump 48 and a heat exchanger 60 and fan assembly 61 operationally connected to one another to remove the heat carried by the coolant from the torch. During one operational embodiment, the pump 48 draws coolant from tank 46 and delivers the coolant to torch 32 through coolant path 49. The coolant absorbs heat from the torch and carries the heated coolant to heat exchanger via path 62. The heat exchanger 60 may include a coiled radiator to remove the heat from the coolant to the surrounding atmosphere and dissipated by fan 61. The cooled coolant is then re-deposited in tank 46 and further allowed to cool before re-circulated back to torch 32. As illustrated, cooling system 44 is integrated within the welder or power source 12. However, the cooling system 44 may be a modular or portable unit separately mounted to the power source or other welding or transport equipment.

Cooling system 44 further includes a check valve 63 in coolant supply path 49 that is biased such that coolant is prevented from flowing out of the system when torch 32 is not connected to the power source. Additionally, the system may be constructed with additional check valves, i.e. check valve 69 in the coolant return path 62, to further regulate coolant flow. The check valves are designed to prevent coolant flow when the torch is not connected or when the power source is being serviced and the like.

Cooling system 44 is designed such that coolant is supplied to tank 46 through a spout 65 that extends externally of the power source 12. Having spout 65 extending outside the power source frame reduces and, preferably, eliminates accidental coolant and internal power source component contact. Tank 46 is preferably constructed to hold approximately three gallons of coolant, such as water.

A coolant level indicator 67 is provided for real-time status of coolant level in the tank. Indicator 67 is preferably mounted externally to the frame of the power source. Additionally, controller 50 may be connected to level indicator 67 such that warnings (audio and visual) may be activated if the coolant falls below acceptable levels.

Figure 3:
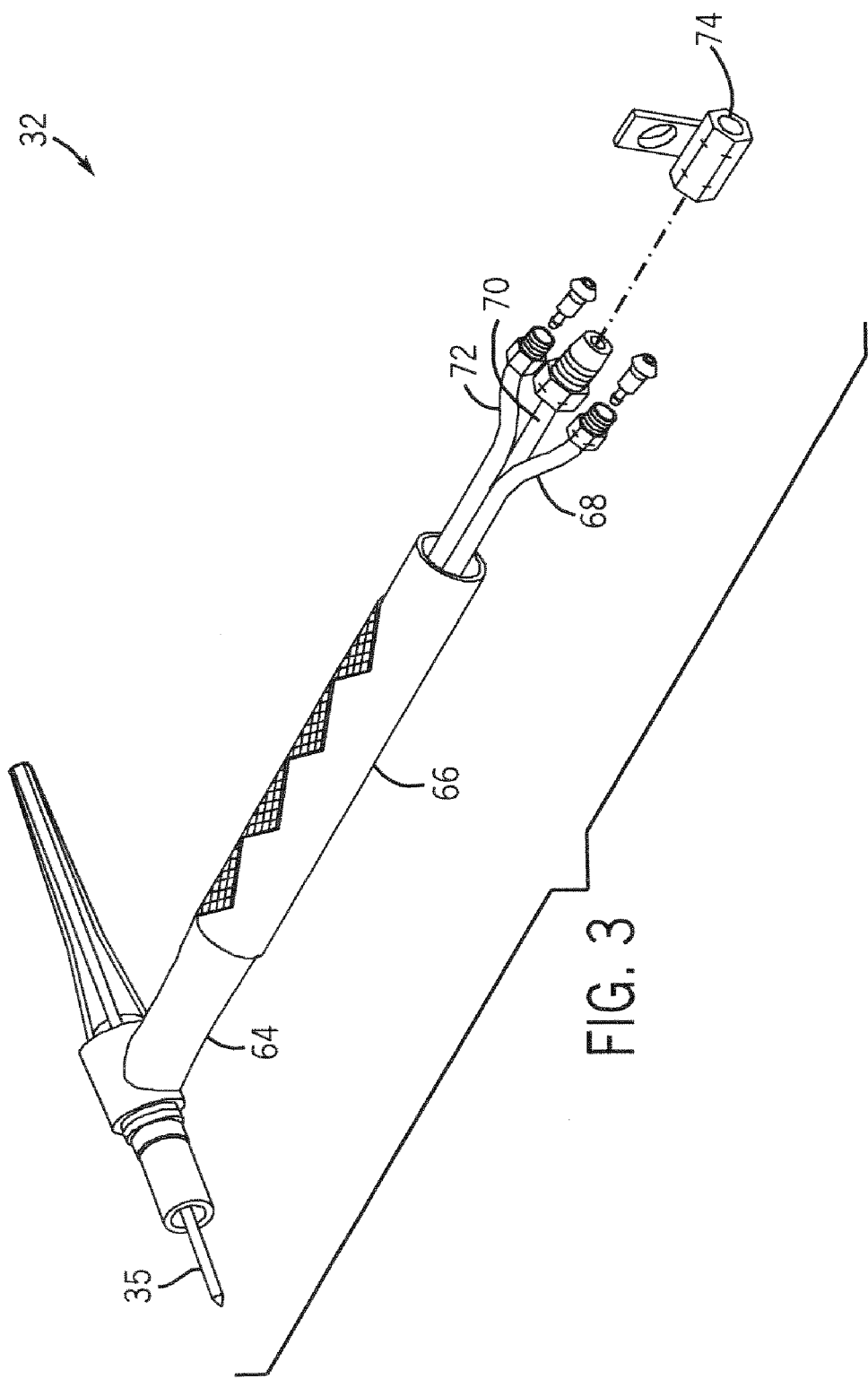
FIG. 3 is a perspective view of a welding torch for use with the present invention.

FIG. 3 illustrates torch 32 as having an elongated tubular body 64 connected to a handle 66. The handle 66 is relatively hollow which allows for extension of a water hose 68, water hose/power cable 70, and a gas hose 72. Hose 68 provides a coolant jacket that facilitates the ingress of coolant to the torch. Torch 32 is constructed to have an input hose 68 and an output hose 70 for carrying coolant to and from the torch. As such, heat generated within the torch is carried away to prevent overheating of the torch. Gas hose 72 facilitates the flow of shielding gas to the weld. Power cable 70 includes an adapter 74 to connect the weld cable from the power source to the torch.

Figure 4:
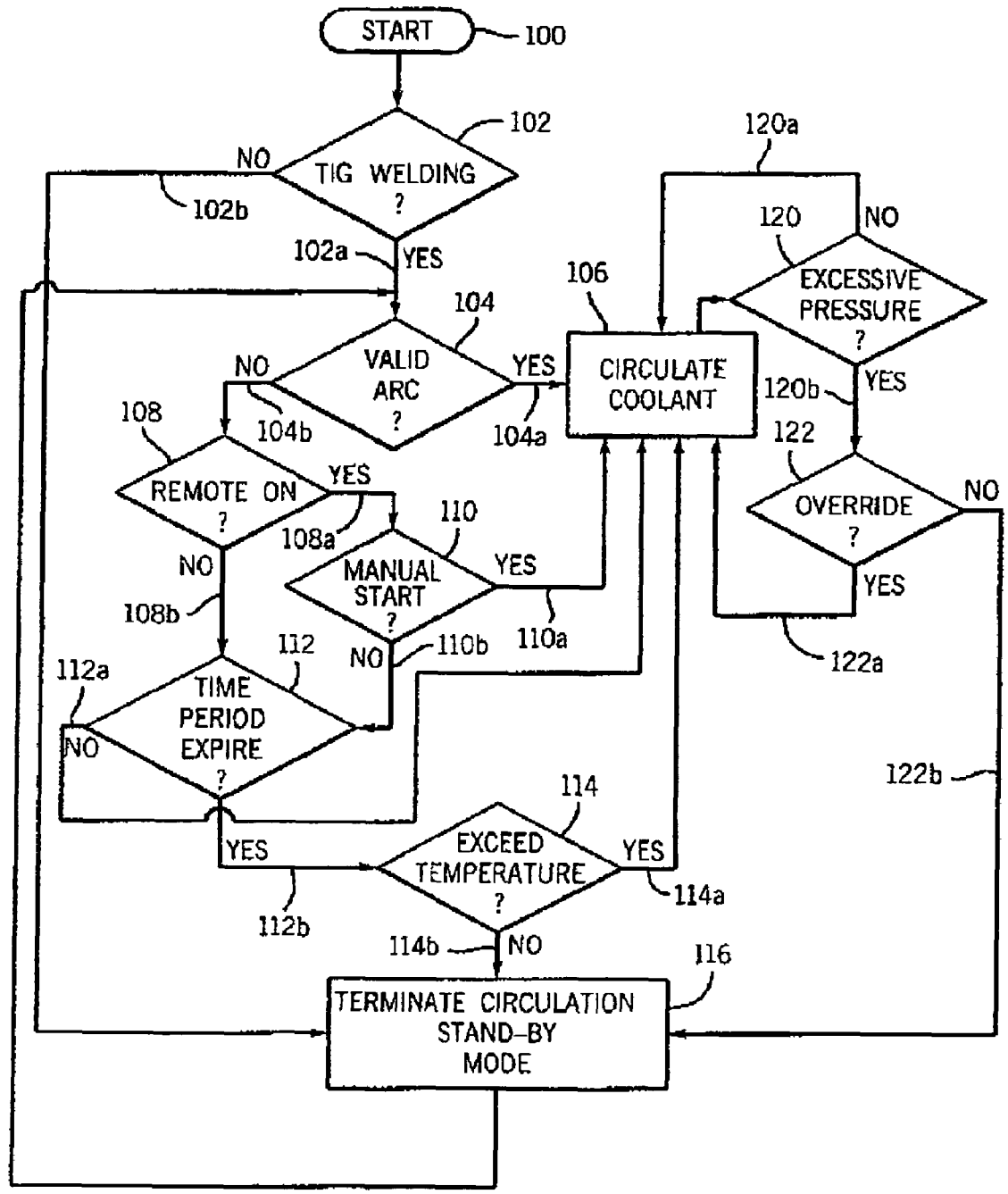
FIG. 4 is a flow chart setting forth the steps of a control algorithm for on-demand coolant circulation through components of a welding system in accordance with the present invention.

Referring now to FIG. 4, the steps of a control algorithm to adaptively regulate cooling of a torch are set forth. The process begins at START 100 with powering-up of the power source, the coolant assembly, and other components of the welding process are likewise powered. Once the user identifies the welding process to be used through appropriate switches on the power source, a determination is made at 102 whether a TIG welding process is to be carried out. Since some welding processes do not require coolant circulation and power sources are capable of carrying out more than one process, the aforementioned determination is preferred and reduces the likelihood that an operator would forget to activate the cooling system for a TIG welding session. If a TIG welding process is not selected 102b, the cooling system is placed in a stand-by mode 116. If TIG welding is selected 102a, the controller 50 then detects whether a valid arc 104 is present at the weld. That is, the controller determines if a welding arc 52 has been struck between the welding torch 32 and the work piece 36 indicative of welding commencement. If a valid arc is present 104a, the controller 50 transmits a circulation commencement signal to the cooling system 44 to activate motor 58 and pump 48 at 106 such that coolant is circulated through the welding torch. If a valid arc is not detected 104b, the controller determines if remote operation has been activated 108. If so 108a, coolant is caused to circulate upon manual start-up of the welding power source 12 at step 110, 110a. The controller then transmits a circulation commencement signal to activate the solenoid pump 48 and cause coolant flow through the torch at step 106. If the controller does not detect a manual start 110b or remote operation 108b, the controller determines if a specified time period has expired after termination of the are at 112. If the time period has not expired 112a, coolant circulation is maintained at 106. If not 112b, the algorithm proceeds to step 114. The controller is configured to regulate the integrated cooling system such that coolant flow is maintained after deactivation of the welding torch until a temperature of the liquid coolant or torch falls below a certain value. The controller 50 compares temperature feedback from a sensor with a first set point temperature to determine if circulation should be maintained. In this regard, if the temperature of the liquid coolant does not exceed the temperature set point 114b, then the integrated cooling system 44 is placed in stand-by mode 116. That is, the controller 50 is configured to repeatedly detect a coolant temperature signal from one or more temperature sensors and if coolant temperature exceeds a threshold 114a, circulation continues independent of welding torch activation status.

The algorithm also instructs the controller to regulate coolant flow based on coolant pressure in the system. As such, break-down in coolant lines or other failures in the cooling system that affect the amount and force of coolant flow are readily identified. An excessive flow condition may indicate that coolant supply pressure has exceeded a maximum level signaling malfunction of the pump and/or motor. Similarly, an insufficient flow condition may indicate a failure of the coolant supply or a general blockage of the coolant supply or return lines. Therefore, the controller 50 detects at step 120 whether coolant pressure is within acceptable limits. If so 120a, circulation continues at 106. If not 120b, the controller determines whether a pressure override has been selected at step 122. If so 122, 122a, coolant flow continues despite the pressure being outside acceptable limits. If not 122, 122b, coolant circulation ceases and the cooling system is returned to stand-by state at 116.

Figure 5:
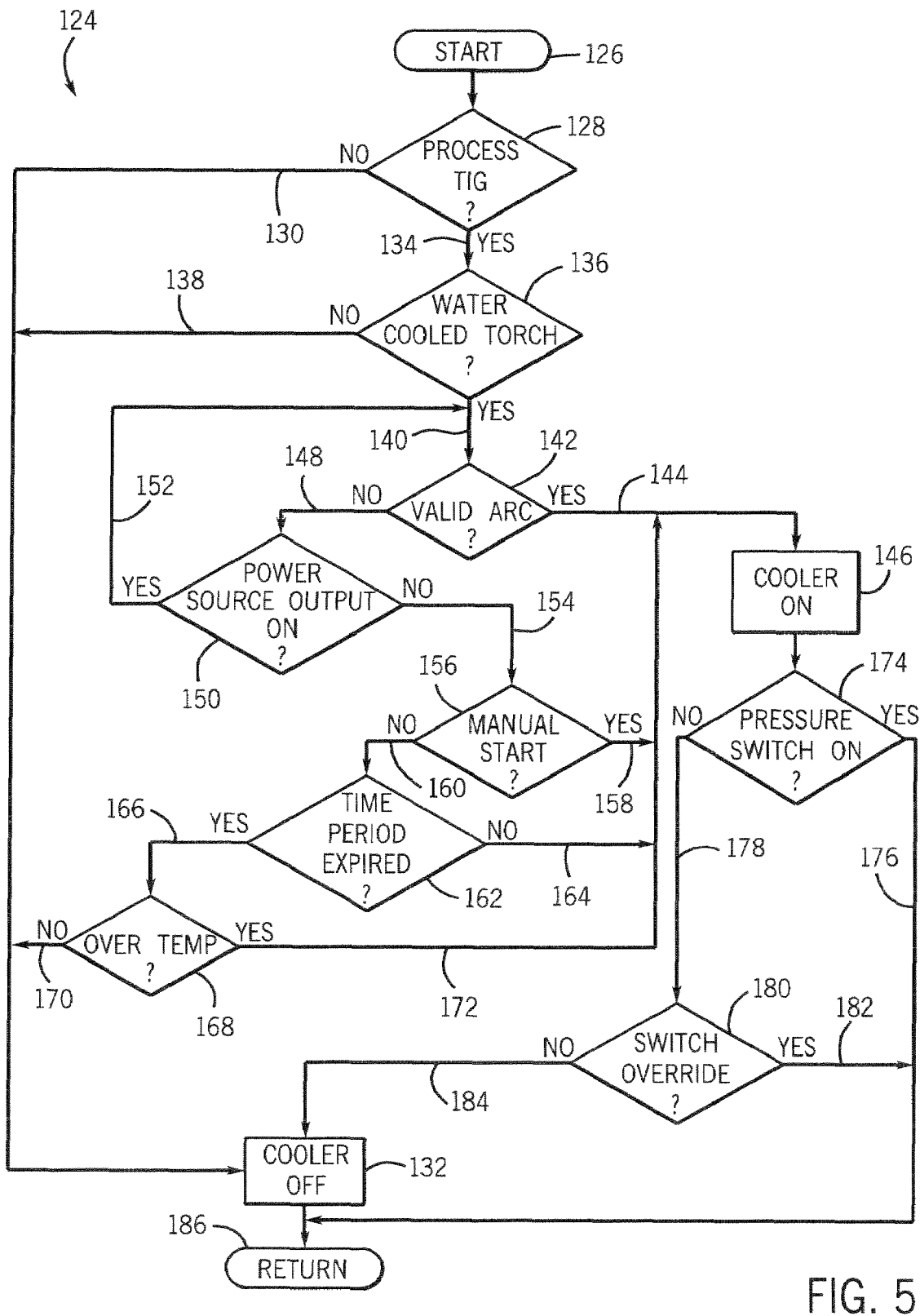
FIG. 5 is a flow chart setting forth the steps of an alternate control algorithm for on-demand coolant circulation through components of a welding system in accordance with the present invention.

Referring now to FIG. 5, the steps of an alternate control algorithm to adaptively regulate cooling of a torch are set forth. The process 124 begins at START 126 with powering-up of the power source, the coolant assembly, and other components of the welding process are likewise powered. A determination is then made at 128 whether a TIG welding process is to be carried out. Since some welding processes do not require coolant circulation and power sources are capable of carrying out more than one process, the aforementioned determination is preferred and reduces the likelihood of operator error. If a TIG welding process is not determined 128, 130, the cooling system is turned off at 132. However, if it is determined that a TIG welding process is to be carried out 128, 134, the controller then determines whether a water cooled torch is connected to the power source at 136. Determination of whether a water cooled TIG torch is connected may be made based on user feedback, feedback from the torch itself, or a combination thereof. If a water cooled TIG torch is not connected 136, 138, the cooling system is turned off at 132 so that coolant is not circulated to the torch. In contrast, if a water cooled TIG torch is connected 136, 140, an arc status is determined at 142.

In this regard, the controller 50 then detects whether a valid arc 142 is present at the weld. That is, the controller determines if a welding arc 52 has been struck between the welding torch 32 and the work piece 36 indicative of welding commencement. If a valid arc is detected 142, 144, the controller 50 transmits a circulation commencement signal to the cooling system 44 to activate motor 58 and pump 48 at 146 such that coolant is circulated through the welding torch. If a valid arc is not detected 142, 148, the controller determines if the power source is outputting power 150. If so 150, 152, the process returns to step 142 to determine if a valid arc is present at the weld. In this regard, if coolant is circulating to the torch, coolant circulation will be maintained if the power source is delivering power even though an arc is not present at the weld. Steps 142-150 will repeat for a maximum period of time, i.e. thirty seconds, whereupon the power source is automatically caused to not deliver power. Simply, when an arc is not present at the weld, the power source is maintained in a power delivery or stand-by mode for a controlled period of time. As such, if the power source is not delivering power 150, 154, the controller determines if coolant circulation is being maintained or otherwise activated manually.

Manual operation of the coolant system allows a user to control the cooling of the torch and/or power source and, as such, override the system. Therefore, if manual control is selected 156, 158, the cooling system is caused to circulate coolant at 146. However, if manual control has not been initiated 156, 160, the process determines if a set time period has expired 162. In this regard, the controller determines if a specified time period has expired after termination of the arc. If the time period has not expired 162, 164, coolant circulation is maintained at 146. If not 162, 166, the process proceeds to step 168.

The controller is configured to regulate the integrated cooling system such that coolant flow is maintained after deactivation of the welding torch until a temperature of the liquid coolant or torch falls below a certain value. Accordingly, the controller 50 compares temperature feedback from a sensor at 168 with a first set point temperature to determine if circulation should be maintained. If the temperature of the liquid coolant does not exceed the temperature set point 168, 170 then the integrated cooling system 44 is turned off and coolant circulation terminates at 132. That is, the controller 50 is configured to repeatedly detect a coolant temperature signal from one or more temperature sensors and if coolant temperature exceeds a threshold 168, 172, circulation continues at 146 independent of welding torch activation status.

The process also instructs the controller to regulate coolant flow based on coolant pressure in the system. As such, break-down in coolant lines or other failures in the cooling system that affect the amount and force of coolant flow are readily identified. An excessive flow condition may indicate that coolant supply pressure has exceeded a maximum level signaling malfunction of the pump and/or motor. Similarly, an insufficient flow condition may indicate a failure of the coolant supply or a general blockage of the coolant supply or return lines. Therefore, the controller 50 detects at step 174 whether a pressure control switch has been activated. If so 174, 176, coolant circulation is maintained. If not 174, 178, the controller determines whether a pressure override has been selected at 180. If so 180, 182, coolant flow continues despite the pressure being outside acceptable limits. If not 180, 184, coolant circulation ceases with the cooling system being turned off at 132.

The heretofore described steps are to be repeatedly executed by one or more processors and, as such, at step 186, the processor loops backs to step 128. For example, the steps of the algorithm are carried out repeatedly every 10 ms by a microprocessor in the power source or cooling system. As such, once the cooling system is placed in stand-by mode or otherwise turned off, the controller confirms that a valid arc has been struck or other indicators that welding has recommenced such as a manual start before recommencement of coolant circulation.

Accordingly, one embodiment of the present invention includes a welding-type component configured to present an electrode to a weld. A cooling system is configured to automatically circulate liquid coolant through at least the welding-type component upon activation of the welding-type component.

In accordance with another embodiment of the invention, a welding apparatus includes a power source and a cooling system. A welding torch is connected to both the power source and the integrated cooling system. A controller is configured to regulate the integrated cooling system such that, upon activation of the welding torch, coolant is caused to at least flow through the welding torch and continue to circulate after deactivation of the welding torch until a temperature of the torch or coolant falls below a certain value.

In accordance with yet another embodiment of the invention, a method for cooling a welding-type component includes the step of detecting activation of a welding-type component. The method further includes that the steps automatically circulating coolant through the welding-type component upon activation of the welding-type component and maintaining coolant circulation through the welding-type component for a limited period after the welding-type component is deactivated.

According to yet another embodiment of the present invention, a welding-type apparatus includes means for providing welding-type power and means for outputting welding-type power to an output area. The apparatus further includes means for detecting activation of the means for the outputting welding-type power and means for automatically circulating coolant through at least the means for providing welding-type power upon activation of the means for outputting welding-type power and maintaining coolant circulation until coolant temperature falls below a certain set point.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

The present invention has been described in terms of the preferred embodiment, and it is recognized that equivalents, alternatives, and modifications, aside from those expressly stated, are possible and within the scope of the appending claims.

The invention claimed is:

1. A welding-type system comprising:
a welding-type component configured to present an electrode to a weld; and
a cooling system configured to automatically circulate coolant through at least the welding-type component upon activation of the welding-type component and maintain coolant circulation upon deactivation of the welding-type component if a measured coolant temperature exceeds a threshold.

2. The welding-type system of claim 1 further comprising a control circuit adapted to electronically communicate with a power source and the welding-type component to affect circulation of coolant through at least the welding-type component and automatically activate the cooling system when the welding-type component is activated and maintain coolant circulation if a temperature of the coolant exceeds a first set point temperature.

3. The welding-type system of claim 1 wherein the cooling system is further configured to circulate coolant through the welding-type component for a set period of time after deactivation of the welding-type component.

4. The welding-type system of claim 3 wherein the cooling system is further configured to automatically terminate circulation when the set period of time expires or temperature of coolant is below a second set point temperature.

5. The welding-type system of claim 1 wherein the welding component includes a welding torch designed to receive a water hose for circulation of water therein.

6. The welding-type system of claim 5 wherein the welding torch further includes a jacket radially spaced from the tubular handle, the jacket configured to facilitate ingress and egress of water in thermal proximity to the tubular handle so as to absorb and dissipate heat thermally translated to the coolant from the tubular handle.

7. The welding-type system of claim 1 wherein the cooling system further comprises a coolant tank, a pump, a motor assembly, a heat exchanger, and a fan operationally connected to one another to circulate coolant to the welding-type component automatically upon activation and during activation of the welding-type component.

8. The welding-type system of claim 7 wherein the heat exchanger includes a coiled radiator and the cooling system further includes a check valve biased to prevent coolant flow when the welding-type component is disconnected from a power source.

9. The welding-type system of claim 1 wherein the power source and the cooling system are disposed within a common enclosure.

10. The welding-type system of claim 1 wherein the activation includes power delivered to the output.

11. The welding-type system of claim 1 wherein the cooling system includes at least one of a pressure sensor and a flow meter to provide feedback as to coolant pressure through the welding-type component.

12. A welding apparatus comprising:
a power source;
a cooling system designed to circulate coolant;
a welding torch connected to the power source and the cooling system; and
a controller configured to
(A) regulate the cooling system such that upon activation of the welding torch coolant is automatically caused to at least flow through the welding torch;
(B) monitor a temperature of the coolant after deactivation of the welding torch; and
(C) continue to circulate coolant until a temperature of the coolant falls below a predetermined value.

13. The welding apparatus of claim 12 wherein the controller is further configured to transmit a circulation commencement signal to the cooling system when an activation signal is detected.

14. The welding apparatus of claim 12 wherein the controller is further configured to transmit a circulation commencement signal to the cooling system automatically upon manual override mode detection.

15. The welding apparatus of claim 12 wherein the controller is further configured to repeatedly detect a coolant temperature signal and if coolant temperature exceeds a threshold, transmit a circulation maintenance signal to the cooling system independent of welding torch activation status.

16. The welding apparatus of claim 12 wherein the controller is further configured to maintain coolant circulation until expiration of a time period following deactivation of the welding torch.

17. The welding apparatus of claim 12 further configured for TIG welding.

18. A method for cooling a welding-type component, the method comprising the steps of:
detecting activation of a welding-type component;
upon activation, automatically circulating coolant through the welding-type component;
upon deactivation, monitoring coolant temperature; and
maintaining coolant circulation through the welding-type component if the coolant temperature exceeds a threshold.

19. The method of claim 18 further comprising the step of maintaining coolant circulation until expiration of a specified time period following deactivation of the welding type component.

20. The method of claim 18 further comprising the step of maintaining coolant circulation until a temperature of the welding-type component falls below a prescribed temperature.

21. The method of claim 18 further comprising the step of maintaining a substantially constant flow of the coolant circulating through the welding-type component.

22. The method of claim 18 further comprising the step of maintaining coolant circulation until a temperature of the coolant circulating within the welding-type component falls below a prescribed temperature.

23. A welding-type apparatus comprising:
means for providing welding-type power;
means for outputting welding-type power to an output area;
means for detecting activation of the means for the outputting welding-type power;
means for automatically circulating coolant through at least the means for providing welding-type power upon activation of the means for outputting welding-type power;
means for detecting deactivation of the means for outputting welding-type power;
means for determining coolant temperature; and
means for maintaining coolant circulation until coolant temperature falls below a certain set point.

24. The welding apparatus of claim 12 wherein the cooling system includes a flow meter to provide feedback as to coolant pressure through the welding torch.

* * * * *